United States Patent
Ito

(10) Patent No.: US 7,418,195 B2
(45) Date of Patent: Aug. 26, 2008

(54) INFORMATION REPRODUCING APPARATUS

(75) Inventor: Hiroaki Ito, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 722 days.

(21) Appl. No.: 11/116,179

(22) Filed: Apr. 28, 2005

(65) Prior Publication Data

US 2005/0244145 A1 Nov. 3, 2005

(30) Foreign Application Priority Data

Apr. 30, 2004 (JP) ............................ 2004-135560

(51) Int. Cl.
*H04N 5/00* (2006.01)
*H04N 7/00* (2006.01)
(52) U.S. Cl. .................................. 386/125; 386/95
(58) Field of Classification Search ................ 386/125, 386/95, 46, 45, 124, 105, 106, 52, 55
See application file for complete search history.

(56) References Cited

U.S. PATENT DOCUMENTS 5,949,955 A * 9/1999 Nakai .......................... 386/106
6,219,043 B1 * 4/2001 Yogeshwar et al. ........... 341/55
2004/0163116 A1 * 8/2004 Taira et al. ..................... 725/89

FOREIGN PATENT DOCUMENTS

JP 2001-312880 11/2004

* cited by examiner

*Primary Examiner*—Robert Chevalier
(74) *Attorney, Agent, or Firm*—Pillsbury Winthrop Shaw Pittman LLP

(57) ABSTRACT

Disclosed is an information reproducing apparatus including a command input part inputting a common command for reproducing a sub-picture menu and for calling a selection screen for sub-picture change; a detecting part detecting existence information of the sub-picture menu and information of user's operation restriction; a setting part setting a precedence relation between reproduction of the sub-picture menu and activation of a sub-picture reproduction selecting function for calling the selection screen for sub-picture change; and a processing selection part which selects processing that is to be executed in precedence over the other out of processing for the reproduction of the sub-picture menu and processing for display of the selection screen for sub-picture change, based on the precedence relation set by the setting part and a result of the detection by the detecting part, when the common command is inputted from the command input part.

9 Claims, 18 Drawing Sheets

FIG. 12

| 1. Japanese: PCM: 5.1ch |
|---|
| 2. English: DD: 5.1ch |

INFORMATION REPRODUCING APPARATUS

CROSS-REFERENCE TO THE INVENTION

This application is based upon and claims the benefit of priority from the prior Japanese Patent Application No. 2004-135560, filed on Apr. 30, 2004; the entire contents of which are incorporated herein by reference.

BACKGROUND

1. Field of the Invention

The present invention relates to an information reproducing apparatus reproducing information from an information recording medium such as, for example, a DVD (Digital Versatile Disc).

2. Description of the Related Art

In a DVD disc, several menus such as a root menu and a title menu (information other than information corresponding to main contents) are sometimes recorded. In response to a user's operation for menu call and reproduction, a current operation state is changed to display of a list of all callable menus. Upon user's selection of a menu that meets the operation purpose of the user from the displayed menu list, the contents of the selected menu is displayed, and it is not until this time that the user can select a desired item in the selected menu (see, for example, Patent document 1).

[Patent document 1] Japanese Patent Laid-Open Application No. 2001-312880 (paragraphs 0055 to 0070, FIGS. 12, 13).

In the above-described conventional example, the user has to perform totally at least two operations, i.e., menu list call and menu selection from the list before calling the intended menu. Moreover, for displaying reduced individual menus simultaneously on a screen as the menu list, a function of reducing the menus is required, which accordingly increases the scale of firmware.

SUMMARY

In consideration of such circumstances, it is an object of the present invention to provide an information reproducing apparatus enabling the operation of determining, with one operation, to which one of menu reproduction and call of a selection screen for sub-picture, audio, angle, chapter (part of title), or the like precedence is to be given over the other, and thus realizing improved operability.

An information reproducing apparatus according to an aspect of the present invention is an information reproducing apparatus that reproduces recorded information from an information recording medium in which existence information of a sub-picture menu and information of user's operation restriction are recorded, the information reproducing apparatus including: a command input part inputting a common command for reproducing the sub-picture menu and for calling a selection screen for sub-picture change; a detecting part detecting the existence information of the sub-picture menu and the information of the user's operation restriction; a setting part setting a precedence relation between reproduction of the sub-picture menu and activation of a sub-picture reproduction selecting function for calling the selection screen for sub-picture change; and a processing selection part which selects processing that is to be executed in precedence over the other out of processing for the reproduction of the sub-picture menu and processing for display of the selection screen for sub-picture change, based on the precedence relation set by the setting part and a result of the detection by the detecting part, when the common command is inputted from the command input part.

In the above-described information reproducing apparatus, "sub-picture (menu)" can be replaced by "audio (menu)", "angle (menu)", "chapter (menu)", or the like.

The present invention enables the operation of determining to which one of menu reproduction and call of a selection screen for sub-picture, audio, angle, chapter, or the like precedence is to be given over the other with one operation, thereby realizing improved operability.

BRIEF DESCRIPTION OF THE DRAWINGS

FIG. 12 is a view showing an example of a selection screen (OSD screen) for audio stream (AST) in the information reproducing apparatus shown in FIG. 3.

FIG. 16 is a view showing an example of a menu selection screen on which desired title information can be searched for.

DETAILED DESCRIPTION

Description of Embodiments

Embodiments of the present invention will be described with reference to the drawings, but these drawings are presented only for an illustrative purpose and in no way limit the present invention.

As a form of an embodiment of the present invention, the information reproducing apparatus may further include an operation state detecting part detecting whether or not a current state is a stop state, and the processing selection part may give precedence to the reproduction of the sub-picture menu when the operation state detecting part detects that the current state is the stop state, while giving precedence to the display of the selection screen for sub-picture change when the operation state detecting part detects that the current state is a state other than the stop state. Here, "sub-picture (menu)" can also be replaced by "audio (menu)", "angle (menu)", "chapter (menu)", or the like.

Hereinafter, embodiments of the present invention will be described with reference to the drawings.

Figure 1:
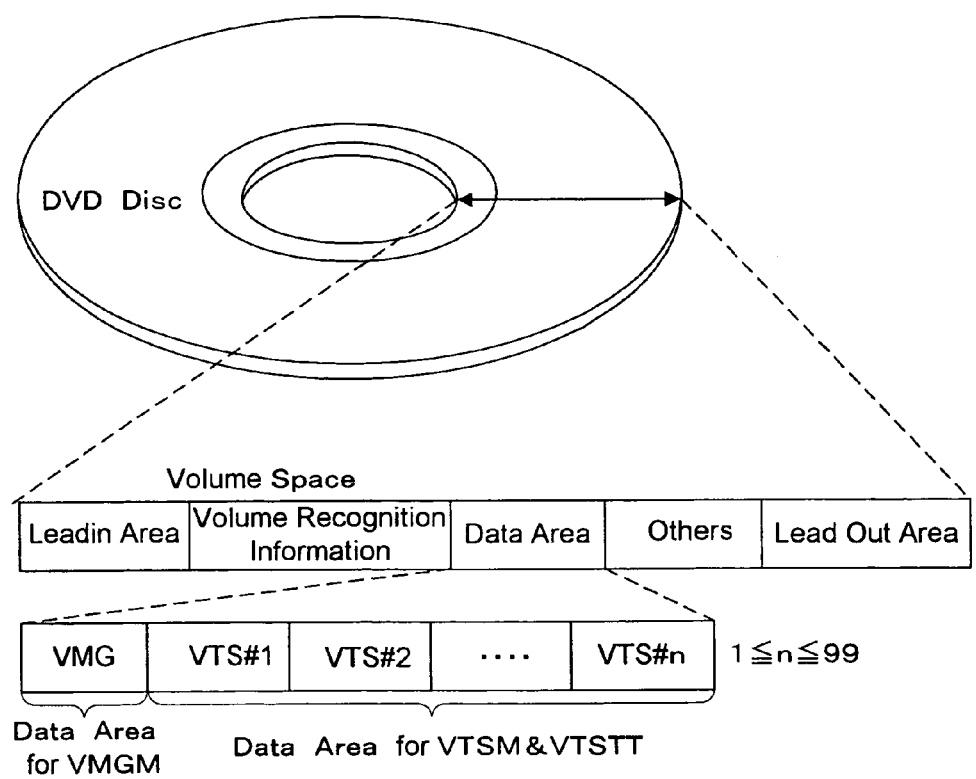
FIG. 1 is a diagram showing a logical structure of a DVD disc.

FIG. 1 shows a logical structure of a DVD disc as an information recording medium from which information is reproduced by an information reproducing apparatus according to one embodiment of the present invention.

This DVD disc is a recording medium that can record only one volume on its one face. DVD video contents including image/audio information and reproduction management information (control information) are written (recorded) in a Data Area, and the Data Area is further divided into a video manager (VMG) area and a video title set (VTS) area. A plurality of video title sets (VTS) can be recorded in the video title set area, the maximum recordable number being 99.

Figure 2:
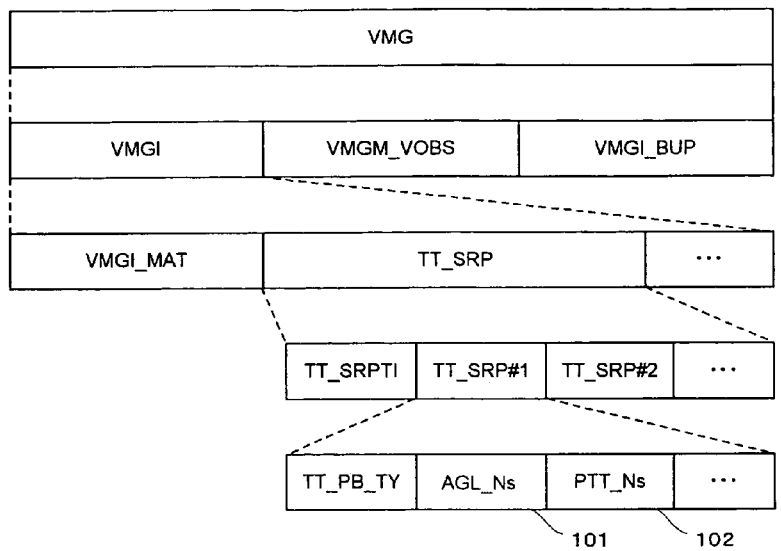
FIG. 2 is a diagram showing data structures of a video manager (VMG) and a video title set (VTS) respectively.
Figure 2:
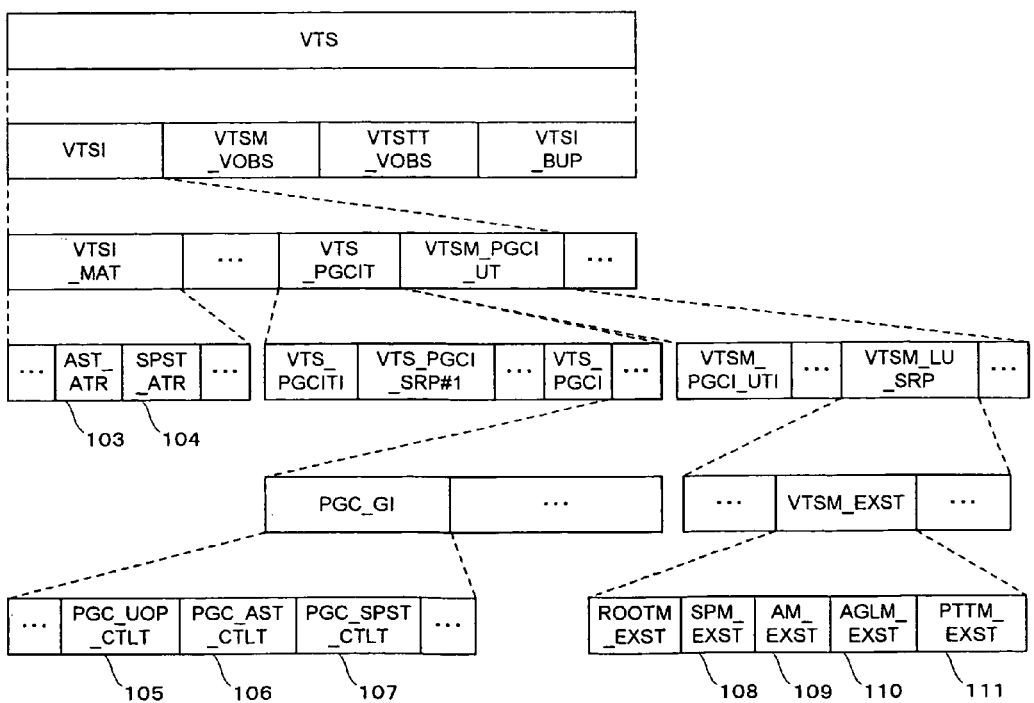

FIG. 2 shows data structures of the video manager (VMG) and the video title set (VTS) respectively.

The video manager (VMG) is composed of control information VMGI and other data (VMGM_VOBS, VMGI_BUP) and only one video manager (VMG) is recordable in one volume. The control information VMGI is information for controlling the video manager menu video object set (VMGM_VOBS) and all the video title sets (VTS) in the volume. Each of the video title sets (VTS) is composed of control information VTSI and other data (VTSM_VOBS, VTSTT_VOBS, VTSI_BUP), its maximum recordable number in one volume being 99. The control information VTSI is information for controlling the video title set menu video object set (VTSM_VOBS) and all the title data (VTSTT_VOBS) in this VTS.

In the control information VMGI of the video manager (VMG), a title search pointer table (TT_SRP) describing title information in the volume is recorded, the title information being classified by title. Further, in the TT_SRP, information on data reproduced in each title is recorded, and this information includes angle number information (AGL_Ns) 101 and PTT (part-of-title) number information (PTT_Ns) 102.

The video title set menu video object set (VTSM_VOBS) of the video title set (VTS) shows video objects of VTSM, but it is not always existing. In order to check the existence of reproducible video objects, a head address of a VTSM program chain information unit table is obtained from a VTSM_PGCI_UT in the control information VTSI and video title set menu existence information (VTSM_EXST) is referred to in the VTSM_PGCI_UT, so that the existence or not of reproducible VTSM_VOBS can be detected.

Information on the existence of five kinds of menus is recorded in the VTSM_EXST, namely, root menu existence information (ROOTM_EXST), sub-picture menu existence information (SPM_EXST) 108, audio menu existence information (AM_EXST) 109, angle menu existence information (AGLM_EXST) 110, and PPT (part-of-title) menu existence information (PTTM_EXST) 111.

The control information VTSI is, as described above, information for controlling image/audio data included in the same VTS. The maximum recordable number of audio streams and the maximum recordable number of sub-pictures, which are multiplexed, are 8 and 32 respectively in the VTS, and attribute information on all of these pieces of information is recorded as audio stream attribute information (AST_ATR) 103 and sub-picture stream attribute information (SP-ST_ATR) 104.

VTS program chain information (VTS_PGCI) is one of information controlling reproduction of a video object. Validity/invalidity of stream reproduction can be set for each of the aforesaid maximum 8 audio streams and maximum 32 sub-picture streams, and these settings are described in a program chain audio stream control table (PGC_AST_CTLT) 106 and a program chain sub-picture stream control table (PGC_SP-ST_CTLT) 107 respectively.

A program chain user operation control (PGC_UOP_CTLT) 105 describes user operations prohibited during PGC reproduction. There are 24 operations defined as user operations, which include title reproduction (Title_Play), title menu call (Menu_Call(Title)), ROOT menu call (Menu_Call(Root)), sub-picture menu call (Menu_Call(Sub-Picture)), audio menu call (Menu_Call(Audio)), angle menu call (Menu_Call(Angle)), PTT menu call (Menu_Call(PTT)), and so on. Permission/prohibition can be designated for each of the 24 user operations (UOP).

Figure 3:
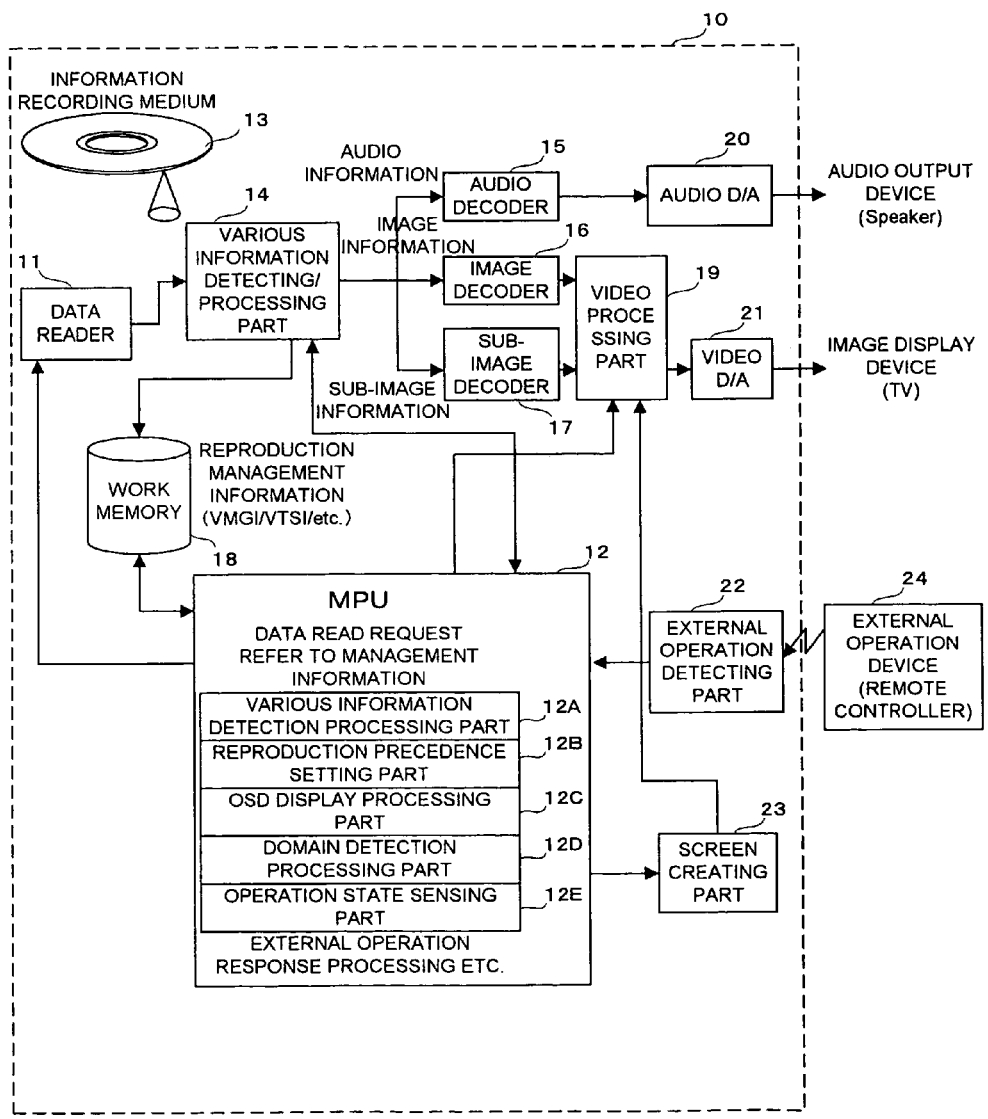
FIG. 3 is a block diagram showing an entire configuration of an information reproducing apparatus according to one embodiment of the present invention.

FIG. 3 is a block diagram showing a configuration of the information reproducing apparatus according to the embodiment of the present invention. As shown in the drawing, this information reproducing apparatus includes a data reader 11 such as an optical disc drive, a MPU (Micro Processing Unit) 12, a various information detecting/processing part 14, an audio decoder 15, an image decoder 16, a sub-image decoder 17, a work memory 18, a video processing part 19, an audio D/A 20, a video D/A 21, an external operation detecting part 22 (command input part), a screen creating part 23, and so on.

The MPU 12 includes a various information detection processing part 12A (detecting part), a reproduction precedence setting part 12B (setting part), an OSD (On Screen Display) display processing part 12C (processing selection part), a domain detection processing part 12D, an operation state sensing part 12E, and so on.

The various information detection processing part 12A detects the VMGI and VTSI based on information from the various information detecting/processing part 14.

The reproduction precedence setting part 12B sets, through a user's selection, a precedence relation between reproduction of various menus such as a sub-picture menu (SPM), an audio menu (AM), an angle menu (AGLM), and a part-of-title menu (PTTM) and activation of a reproduction selecting function for calling a selection screen for change of sub-picture, audio, angle, part of title, or the like.

Base on the information from the various information detection processing part 12A, the OSD (On Screen Display) display processing part 12C controls the screen creating part 23 to create a selection screen for change of SPM, AM, AGLM, or PTTM and to display the screen on a reproduction screen.

The domain detection processing part 12D detects a domain as a reproduction target of the information reproducing apparatus. Domains of video objects as reproduction targets include a VMGM domain, a VTSM domain, a title domain, a first-play domain, and so on.

The operation state sensing part 12E detects an operation state of the information reproducing apparatus such as a stop state, a reproduction state, and so on.

Next, acquisition of the VTSI and stream change processing by the information reproducing apparatus described above will be described. Following an instruction from the MPU 12, the data reader (an optical disc drive or the like) 11 obtains data at a designated position in the Data Area on the information recording medium (DVD disc) 13. The information detecting/processing part 14 classifies the obtained data by each attribute such as audio, image, and sub-image, and each of the classified data is transferred to the audio decoder 15, the image decoder 16, the sub-image decoder 17, or the work memory 18.

Here, the control information such as the VTSI shown in FIG. 2 is temporarily recorded in the work memory 18. Further, the MPU 12 can refer to the control information. The MPU 12 refers to the SPM_EXST 108, the AM_EXST 109, the AGLM_EXST 110, and the PTTM_EXST 111 in the VTSM_EXST shown in FIG. 2 from the control information, so that it can recognize the existence or not of the VTSM_VOBS.

A user can transmit information to the MPU 12 via an external operation device 24 such as a remote controller.

Next, an implementation example of a menu call function of the external operation device 24 will be described.

Figure 4:
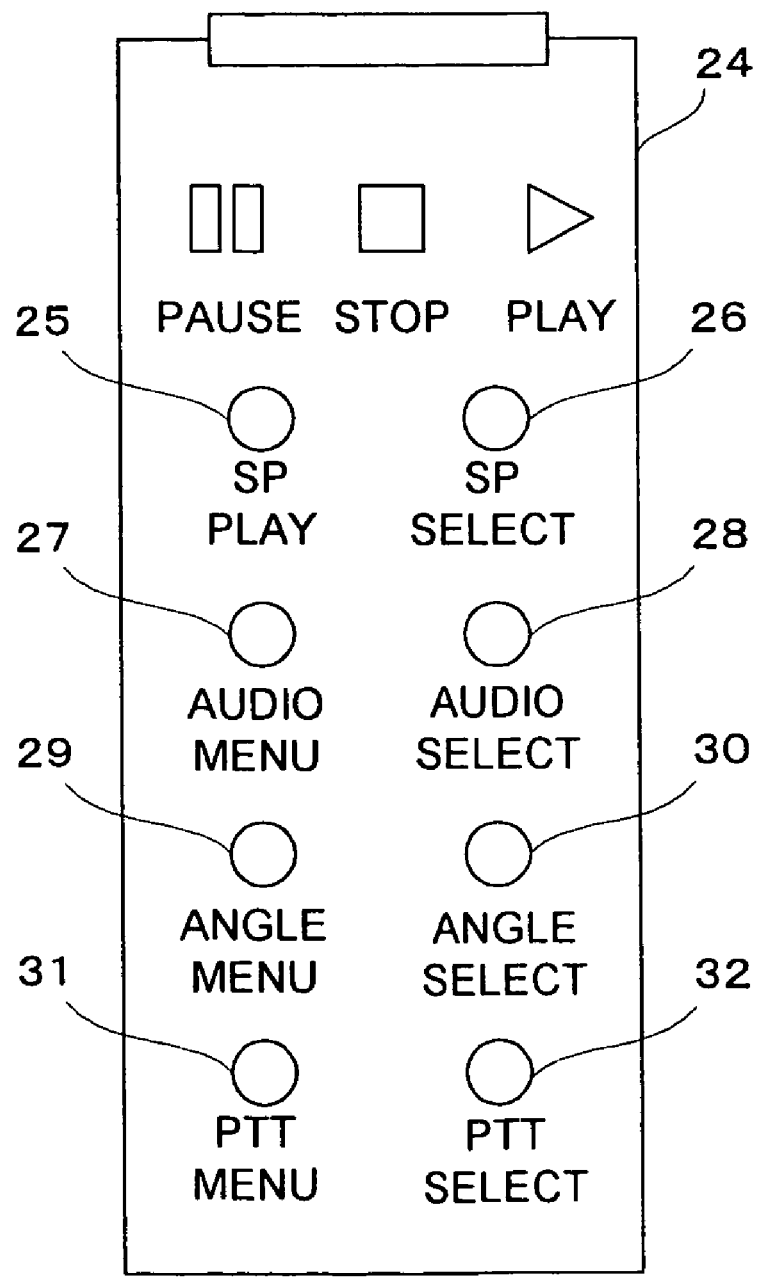
FIG. 4 is a view showing an implementation example of a menu call function of an external operation device.

FIG. 4 shows an example where the external operation device 24 is provided with a "SP MENU" button 25 and a "SP SELECT" button 26, which are selectively used when a user calls the sub-picture menu (SPM) or a changing function for sub-picture stream (SPST). Similarly to the buttons for the sub-picture, two buttons are also provided for audio, angle, and chapter (part of title), namely, "AUDIO MENU" button 27 and an "AUDIO SELECT" button 28 for audio, an "ANGLE MENU" button 29 and an "ANGLE SELECT" button 30 for angle, and a "PTT MENU" button 31 and a "PTT SELECT" button 32 for part of title (chapter).

In this example, however, the external operation device 24 is provided with two buttons with similar functions for each of sub-picture, audio, angle, and part of title, which tends to confuse a user. Moreover, in such cases where change operation prohibition/restriction as is described in the PGC_UOP_CTLT 105 exists or where the SPM does not exist, a user has to use the two buttons, which also tends to confuse the user.

Figure 5:
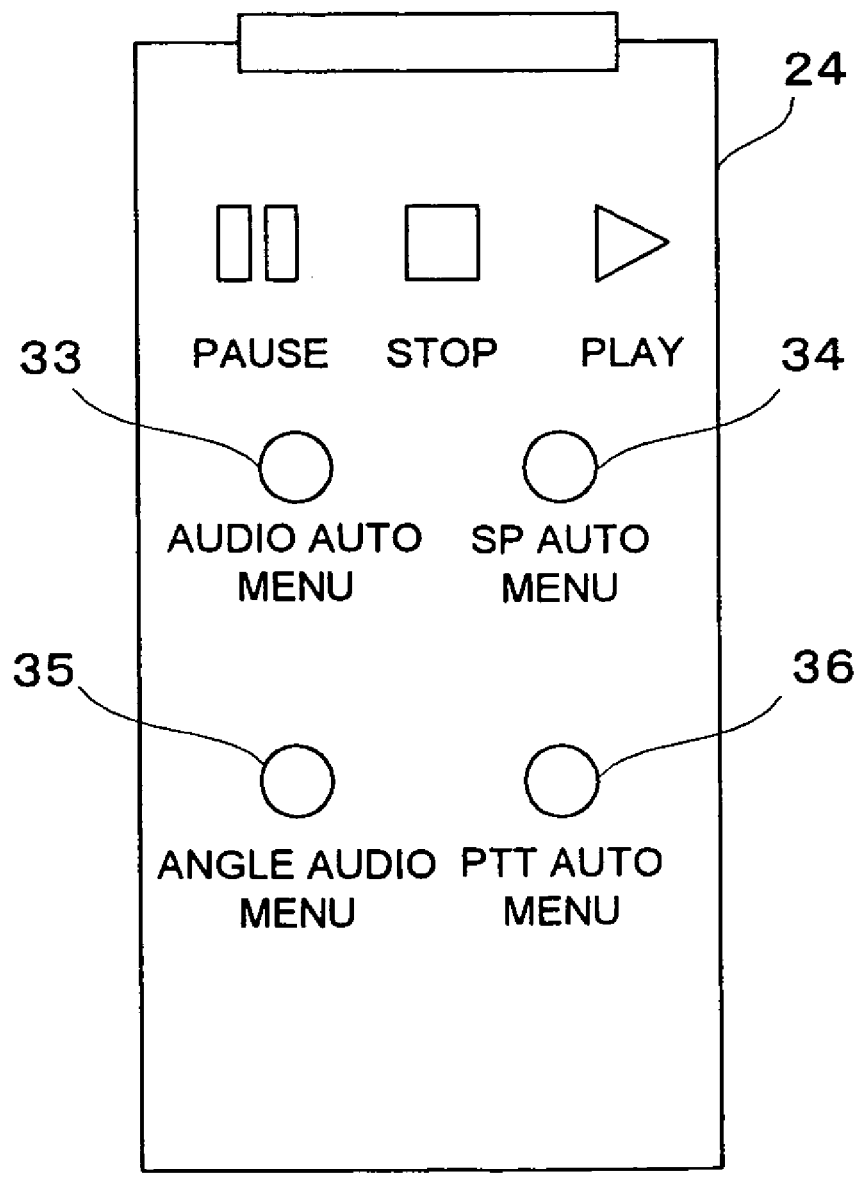
FIG. 5 is a view showing another implementation example of the menu call function of the external operation device.

On the other hand, in the external operation device 24 shown in FIG. 5, one automatic menu determining (SP AUTO MENU) button 34 is provided instead of the two buttons of the SP MENU button 25 and the SP SELECT button 26 shown in FIG. 4, and similarly, as for audio, angle, and part of title (chapter), one automatic menu determining (AUDIO AUTO MENU) button 33 is provided instead of the two buttons of the AUDIO MENU button 27 and the AUDIO select button 28 shown in FIG. 4, one automatic menu determining (ANGLE AUTO MENU) button 35 is provided instead of the two buttons of the ANGLE MENU button 29 and the ANGLE SELECT button 30 shown in FIG. 4, and one automatic menu determining (PTT AUTO MENU) button 36 is provided instead of the two buttons of the PTT MENU button 31 and the PTT SELECT button 32 shown in FIG. 4.

Next, an operation of the information reproducing apparatus of this embodiment will be described.

Figure 6:
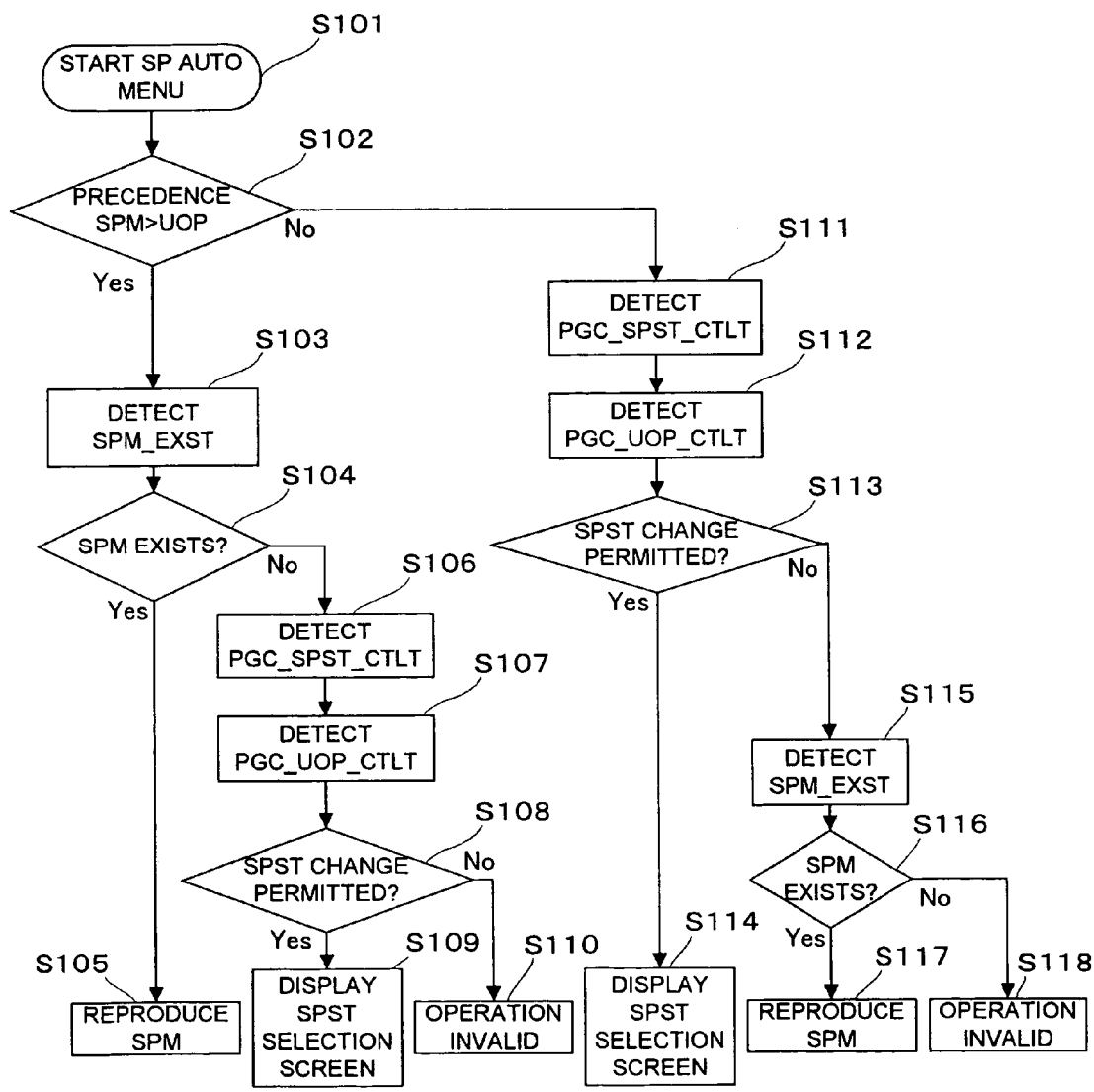
FIG. 6 is a flowchart showing sub-picture selection processing in the information reproducing apparatus shown in FIG. 3.

FIG. 6 is a flowchart showing sub-picture stream selection processing in the information reproducing apparatus of this embodiment.

When a user presses, for example, the SP AUTO MENU button 34 of the external operation device 24 shown in FIG. 5 (Step S101), the precedence relation, which is set by the reproduction precedence setting part 12B, between the reproduction of the sub-picture menu (SPM) and the activation of the SPST reproduction selecting function by UOP is judged (Step S102). When the SPM reproduction has precedence over the activation of the SPST reproduction selecting function by UOP, the SPM_EXST 108 is detected (Step S103) and then, when the SPM exists (YES at Step S104), the SPM reproduction (Step S105) is executed.

When the SPM does not exist, it is detected whether or not any other selectable SP exists, based on the PGC_SP-ST_CTLT 107 (Step S106), and it is further detected whether or not the change of the SP by a user's operation is permitted, based on the PGC_UOP_CTLT 105 under reproduction (Step S107). When the change is permitted (YES at Step S108), the reproduction selecting function is activated so that the SPST selection screen (OSD screen) created by the screen creating part 23 is displayed (Step S109). When the SP change by a user's operation is not permitted or when only a single SPST is recorded (NO at Step S108), the operation becomes invalid (Step S110).

On the other hand, when it is judged at Step S102 that the activation of the SPST reproduction selecting function by UOP has precedence over the SPM reproduction, it is detected whether or not any other selectable SP exists, based on the PGC_SPST_CTLT 107 (Step S111), and it is further detected whether or not the change of the SP by a user is permitted, based on the PGC_UOP_CTLT 105 under reproduction (Step S112). When the change of the SP by a user is permitted (YES at Step S113), the reproduction selecting function is activated so that the SPST selection screen (OSD screen) created by the screen creating part 23 is displayed (Step S114).

When the change of the SP by a user is not permitted and the plural SPSTs are recorded (NO at Step S113), the SPM_EXST 108 is then detected (Step S115) to judge the existence or not of the SPM (Step S116). When the SPM exists, the SPM reproduction is executed (Step S117). When the SPM does not exist, the operation becomes invalid (Step S118).

As described above, the set precedence relation between the SPM reproduction and the activation of the SPST reproduction selecting function by UOP is judged, and when the SPM reproduction has precedence, the SPM reproduction is given precedence over the display of the SPST selection screen, and when, on the other hand, the activation of the SPST reproduction selecting function by UOP has precedence, the display of the SPST selection screen is given precedence over the SPM reproduction. This makes it possible to execute the SPM reproduction or the display of the SPST selection screen with one operation, which can lighten the operation load on the user.

Figure 7:
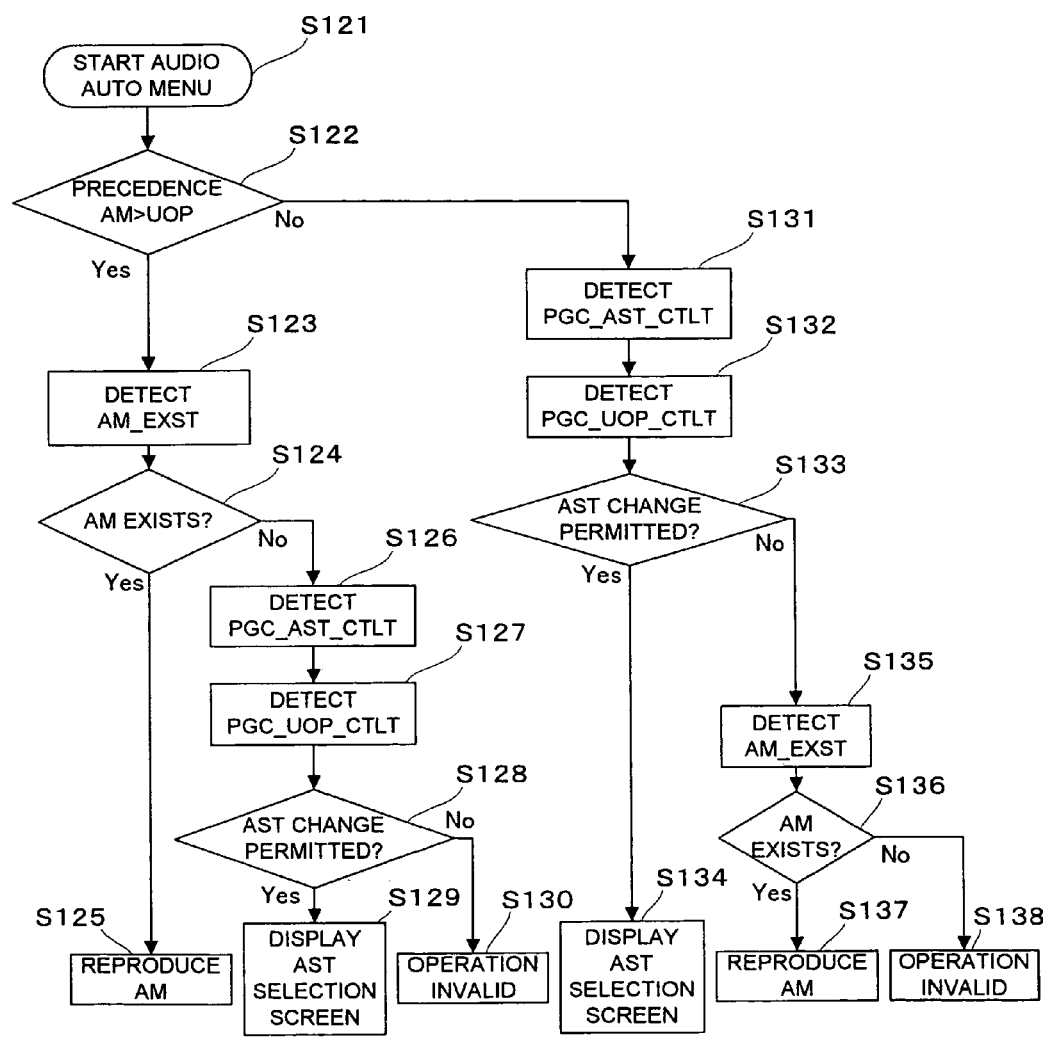
FIG. 7 is a flowchart showing audio selection processing in the information reproducing apparatus shown in FIG. 3.

FIG. 7 is a flowchart showing audio stream selection processing in the information reproducing apparatus of this embodiment.

When a user presses, for example, the AUDIO AUTO MENU button 33 of the external operation device 24 shown in FIG. 5 (Step S121), the precedence relation, which is set by the reproduction precedence setting part 12B, between audio menu (AM) reproduction and the activation of an AST reproduction selecting function by UOP is judged (Step S122). When the AM reproduction has precedence over the activation of the AST reproduction selecting function by UOP, the AM_EXST 109 is detected (Step S123), and then when the AM exists (YES at Step S124), the AM reproduction (Step S125) is executed.

When the AM does not exist, it is detected whether or not any other selectable AM exists, based on the PGC_AST_CTLT 106 (Step S126), and it is further detected whether or not the change of the AM by a user's operation is permitted, based on the PGC_UOP_CTLT 105 under reproduction (S127). When the change is permitted (YES at Step S128), the reproduction selecting function is activated so that the AST selection screen (OSD screen) created by the screen creating part 23 is displayed (Step S129). When the change of the AM by a user's operation is not permitted or when only a single AST is recorded (NO at Step S128), the operation becomes invalid (Step S130).

On the other hand, when it is judged at Step S122 that the activation of the AST reproduction selecting function by UOP has precedence over the AM reproduction, it is detected whether or not any other selectable AM exists, based on the PGC_AST_CTLT 106 (Step S131), and it is further detected whether or not the change of the AM by the user is permitted, based on the PGC_UOP_CTLT 105 under reproduction (Step S132). When the change of the AM by a user is permitted (YES at Step S133), the AST reproduction selecting function is activated so that the AST selection screen (OSD screen) created by the screen creating part 23 is displayed (Step S134).

When the change of the AM by a user is not permitted and the plural ASTs are recorded (NO at Step S133), the AM_EXST 109 is then detected (Step S135) to judge the existence or not of the AM (Step S136). When the AM exists, the AM reproduction is executed (Step S137). When the AM does not exist, the operation becomes invalid (Step S138).

As described above, the set precedence relation between the AM reproduction and the activation of the AST reproduction selecting function by UOP is judged, and when the AM reproduction has precedence, the AM reproduction is given precedence over the display of the AST selection screen, and when, on the other hand, the activation of the AST reproduction selecting function by UOP has precedence, the display of the AST selection screen is given precedence over the AM reproduction. This makes it possible to execute the AM reproduction or the display of the AST selection screen with one operation, which can lighten the operation load on the user.

Figure 8:
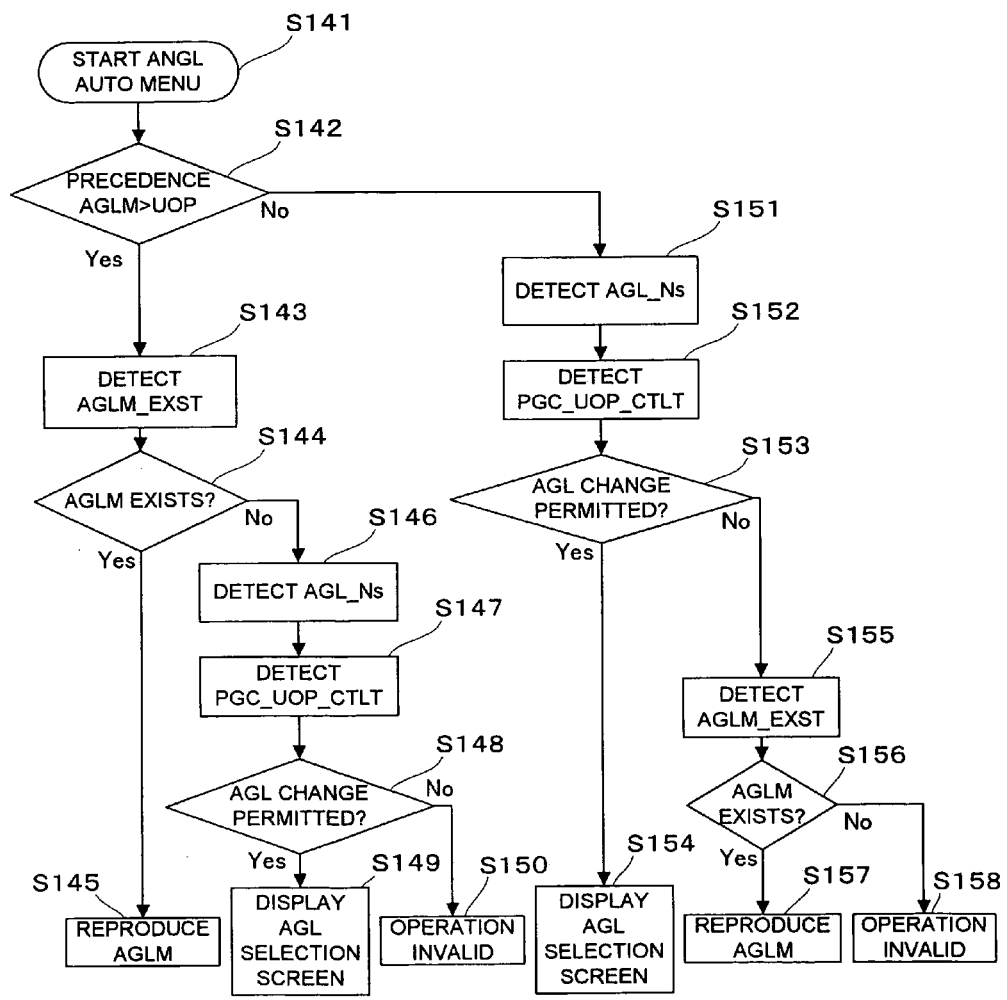
FIG. 8 is a flowchart showing angle selection processing in the information reproducing apparatus shown in FIG. 3.

FIG. 8 is a flowchart showing angle selection processing in the information reproducing apparatus of this embodiment.

When a user presses, for example, the ANGLE AUTO MENU button 35 of the external operation device 24 shown in FIG. 5 (Step S141), the precedence relation, which is set by the reproduction precedence setting part 12B, between angle menu (AGLM) reproduction and the activation of an AGL reproduction selecting function by UOP is judged (Step S142). When the AGLM reproduction has precedence over the activation of the AGL reproduction selecting function by UOP, the AGLM_EXST 110 is detected (Step S143) and then when the AGLM exists (YES at Step S144), the AGLM reproduction (Step S145) is executed.

When the AGLM does not exist, it is detected whether or not any other selectable AGL exists, based on the AGL_Ns 101 of the VMGI (Step S146), and it is detected whether or not the change of the AGL by a user's operation is permitted, based on the PGC_UOP_CTLT 105 under reproduction (S147). When the change is permitted (YES at Step S148), the AGL reproduction selecting function is activated so that the AGL selection screen (OSD screen) created by the screen creating part 23 is displayed (Step S149). When the change of the AGL by a user's operation is not permitted or when only a single AGL is recorded (NO at Step S148), the operation becomes invalid (Step S150).

On the other hand, when it is judged at Step S142 that the activation of the AGL reproduction selecting function by UOP has precedence over the AGLM reproduction, it is detected whether or not any other selectable AGLM exists, based on the AGL_Ns 101 (Step S151), and it is further detected whether or not the change of the AGL by the user is permitted, based on the PGC_UOP_CTLT 105 under reproduction (Step S152). When the change of the AGL by a user is permitted (YES at Step S153), the AGL reproduction selecting function is activated so that the ALG selection screen (OSD screen) created by the screen creating part 23 is displayed (Step S154).

When the change of the AGL by a user is not permitted and the plural AGLs are recorded (NO at Step S153), the AGLM_EXST 110 is then detected (Step S155) to judge the existence or not of the AGLM (Step S156). When the AGLM exists, the AGLM reproduction is executed (Step S157). When the AGLM does not exist, the operation becomes invalid (Step S158).

As described above, the set precedence relation between the AGLM reproduction and the activation of the AGL reproduction selecting function by UOP is judged, and when the AGLM reproduction has precedence, the AGLM reproduction is given precedence over the display of the AGL selection screen, and when, on the other hand, the activation of the AGL reproduction selecting function by UOP has precedence, the display of the AGL selection screen is given precedence over the AGLM reproduction. This makes it possible to execute the AGLM reproduction or the display of the AGL selection screen with one operation, which can lighten the operation load on the user.

Figure 9:
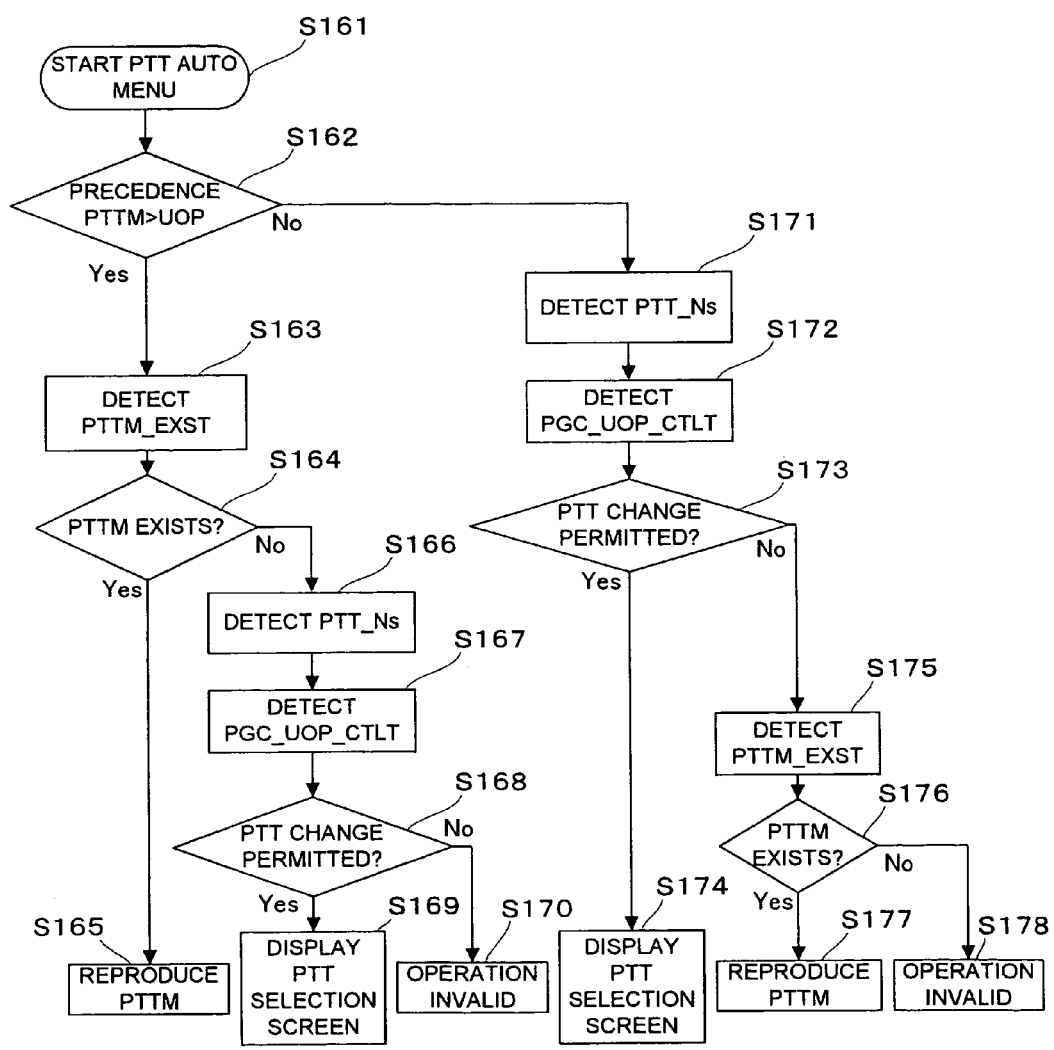
FIG. 9 is a flowchart showing part-of-title (chapter) selection processing in the information reproducing apparatus shown in FIG. 3.

FIG. 9 is a flowchart showing part-of-title (chapter) selection processing in the information reproducing apparatus of this embodiment.

When a user presses, for example, the PTT AUTO MENU button 36 of the external operation device 24 shown in FIG. 5 (Step S161), the precedence relation, which is set by the reproduction precedence setting part 12B, between part-of-title menu (PTTM) reproduction and the activation of a chapter reproduction selecting function by UOP is judged (Step S162). When the PTTM reproduction has precedence over the activation of the chapter reproduction selecting function, the PTTM_EXST 111 is detected (Step S163), and then when the PTTM exists (YES at Step S164), the PTTM reproduction (Step S165) is executed.

When the PTTM does not exist, it is detected whether or not any other selectable PTTM exists, based on the PTT_Ns 102 (Step S166), and it is judged whether or not the change of the PTT by a user's operation is permitted, based on the PGC_UOP_CTLT 105 under reproduction (S167). When the change is permitted (YES at Step S168), the chapter reproduction selecting function is activated so that the PTT selection screen (OSD screen) created by the screen creating part 23 is displayed (Step S169). When the change of the PTT by a user's operation is not permitted or when only a single PTTM is recorded (NO at Step S168), the operation becomes invalid (Step S170).

On the other hand, when it is judged at Step S162 that the activation of the chapter reproduction selecting function by UOP has precedence over the PTTM reproduction, it is detected whether or not any other selectable PTTM exists, based on the PTT_Ns 102 (Step S171), and it is further detected whether or not the change of the PTT by a user is permitted, based on the PGC_UOP_CTLT 105 under reproduction (Step S172). When the change of the PTT by a user is permitted (YES at Step S173), the chapter reproduction selecting function is activated so that the PTT selection screen (OSD screen) created by the screen creating part 23 is displayed (Step S174).

When the change of the PTT by a user is not permitted and the plural PTTs are recorded (NO at Step S173), the PTT-M_EXST 111 is then detected (Step S175) to judge the existence or not of the PTTM (Step S176). When the PTTM exists, the PTTM reproduction is executed (Step S177). When the PTTM does not exist, the operation becomes invalid (Step S178).

As described above, the set precedence relation between the PTTM reproduction and the activation of the chapter reproduction selecting function by UOP is judged, and when the PTTM reproduction has precedence, the PTTM reproduction is given precedence over the display of the PTTM selection screen, and when, on the other hand, the activation of the chapter reproduction selecting function by UOP has precedence, the display of the PTTM selection screen is given precedence over the PTTM reproduction. This makes it possible to execute the PTTM reproduction or the activation of the display of the PTTM selection screen with one operation, which can lighten the operation load on the user.

Figure 10:
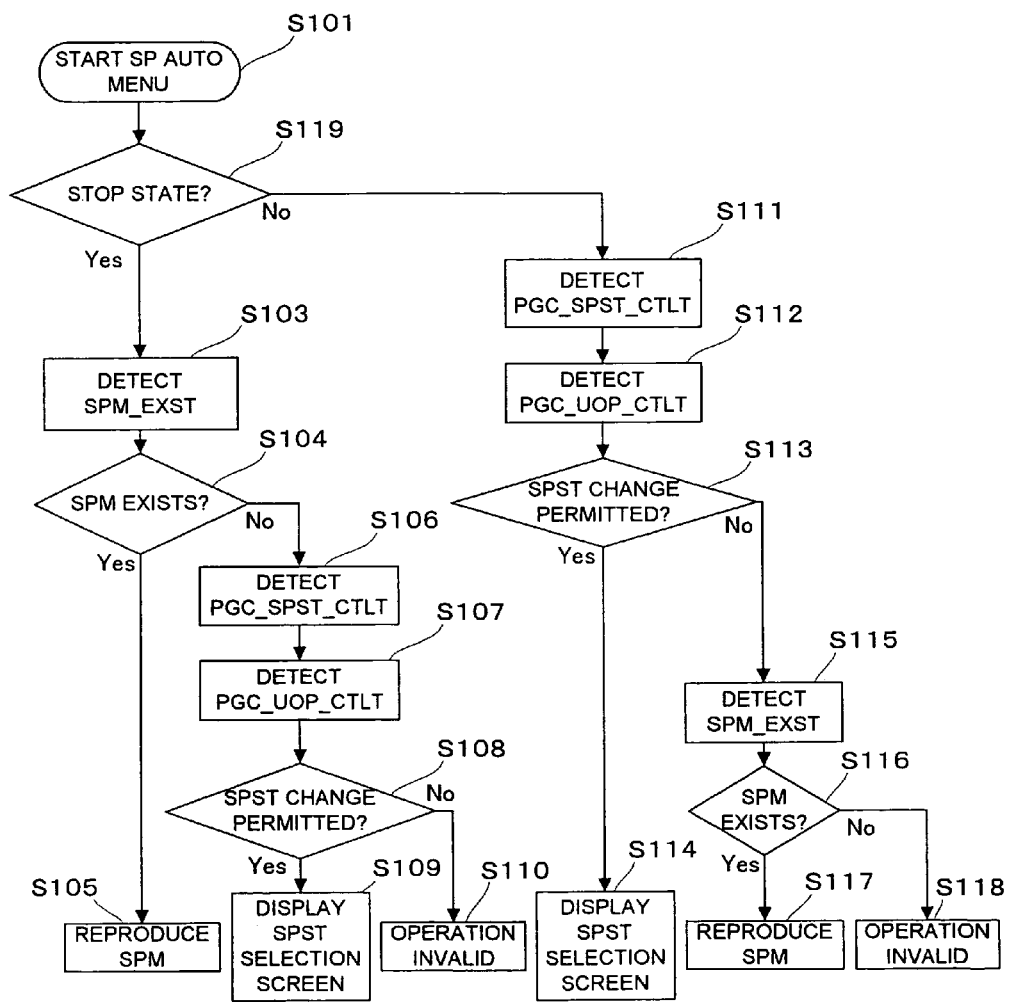
FIG. 10 is a flowchart showing sub-picture selection processing in the information reproducing apparatus shown in FIG. 3 when display precedence is changed according to a domain under execution (operation state).

FIG. 10 is a flowchart showing sub-picture stream selection processing in the information reproducing apparatus of this embodiment when display precedence is changed depending on the operation state.

When a user presses, for example, the SP AUTO MENU button 34 of the external operation device 24 shown in FIG. 5 (Step S101), the operation state of the information reproducing apparatus is detected (Step S119). In a case of a stop state, the SPM_EXST 108 is detected (Step S103), and when the SPM exists (YES at Step S104), SPM reproduction (Step S105) is executed.

When the SPM does not exist, it is detected whether or not any other selectable SP exists, based on the PGC_SP-ST_CTLT 107 (Step S106), and it is detected whether or not the change of the SP by a user's operation is permitted, based on the PGC_UOP_CTLT 105 under reproduction (Step S107). When the change is permitted (YES at Step S108), the SPST reproduction selecting function is activated so that the SPST selection screen (OSD screen) created by the screen creating part 23 is displayed (Step S109). When the change of the SP by a user's operation is not permitted or when only a single SPST is recorded (NO at Step S108), the operation becomes invalid (Step S110).

On the other hand, when it is judged at Step S119 that the operation state is not the stop state, it is detected whether or not any other selectable SP exists, based on the PGC_SP-ST_CTLT 107 (Step S111), and it is further detected whether or not the change of the SP by a user is permitted, based on the PGC_UOP_CTLT 105 under reproduction (Step S112). When the change of the SP by a user is permitted (YES at Step S113), the SPST reproduction selecting function is activated so that the SPST selection screen (OSD screen) created by the screen creating part 23 is displayed (Step S114).

When the change of the SP by a user is not permitted and the plural SPSTs are recorded (NO at Step S113), the SPM_EXST 108 is then detected (Step S115) to judge the existence or not of the SPM (Step S116). When the SPM exists, the SPM reproduction is executed (Step S117). When the SPM does not exist, the operation becomes invalid (Step S118).

Note that this change of the display precedence based on the operation state of the information reproducing apparatus is also applicable to audio stream selection, angle selection, and part-of-title selection, not limited to the sub-picture stream selection.

Figure 11:
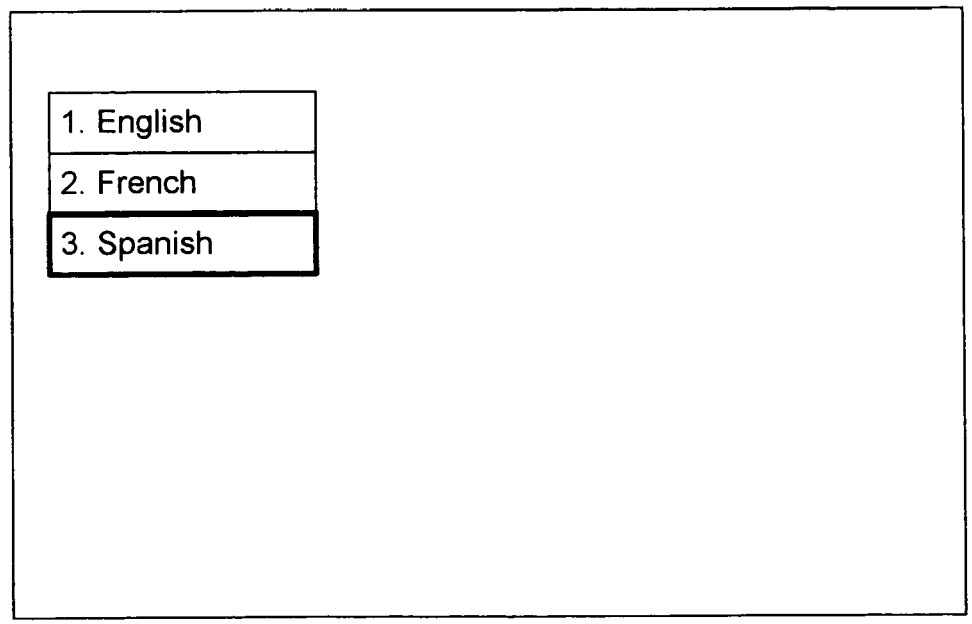
FIG. 11 is a view showing an example of a selection screen (OSD screen) for sub-picture stream (SPST) in the information reproducing apparatus shown in FIG. 3.

FIG. 11 shows an example of a selection screen (OSD screen) for sub-picture stream (SPST) in the information reproducing apparatus of this embodiment.

This SPST selection screen displays information on three SPs (language and so on), and a user can select a desired SP by, for example, operating the external operation device 24. The OSD display processing part 12C creates, through the screen creating part 23, such a SPST selection screen by using, for example, the SPST_ATR 104 and the PGC_SP-ST_CTLT 107.

Figure 12:
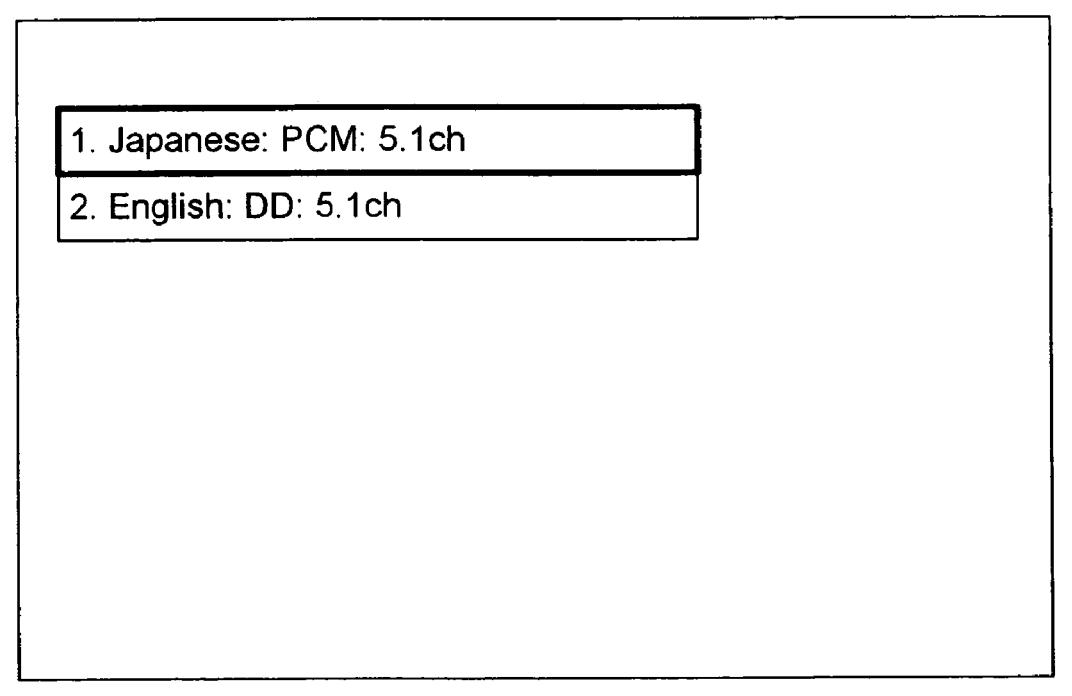

FIG. 12 shows an example of a selection screen (OSD screen) for audio stream (AST) in the information reproducing apparatus of this embodiment.

This AST selection screen displays information on two ASTs (language and so on), and a user can select a desired AST by, for example, operating the external operation device 24. The OSD display processing part 12C creates, through the screen creating part 23, such an AST selection screen by using, for example, the AST_ATR 103 and the PGC_AST_CTLT 106.

Figure 13:
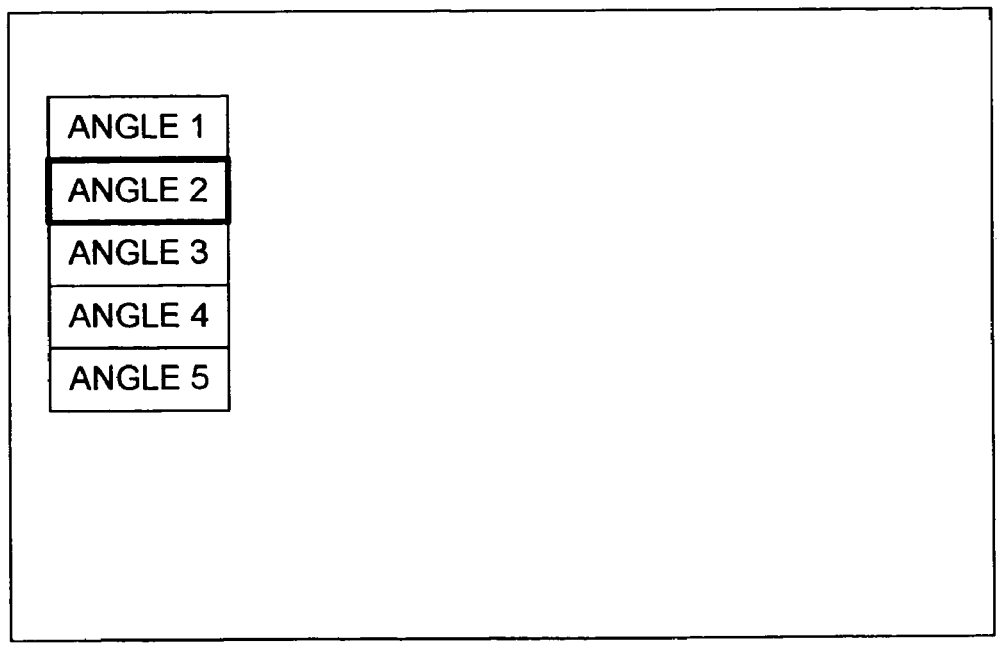
FIG. 13 is a view showing an example of a selection screen (OSD screen) for angle (AGL) in the information reproducing apparatus shown in FIG. 3.

FIG. 13 shows an example of a selection screen (OSD screen) for angle (AGL) in the information reproducing apparatus of this embodiment. This AGL selection screen displays information on five AGLs, and a user can select a desired AGL by, for example, operating the external operation device 24. The OSD display processing part 12C creates, through the screen creating part 23, such an AGl selection screen by using, for example, the AGL_Ns 101 of the VMGI.

Figure 14:
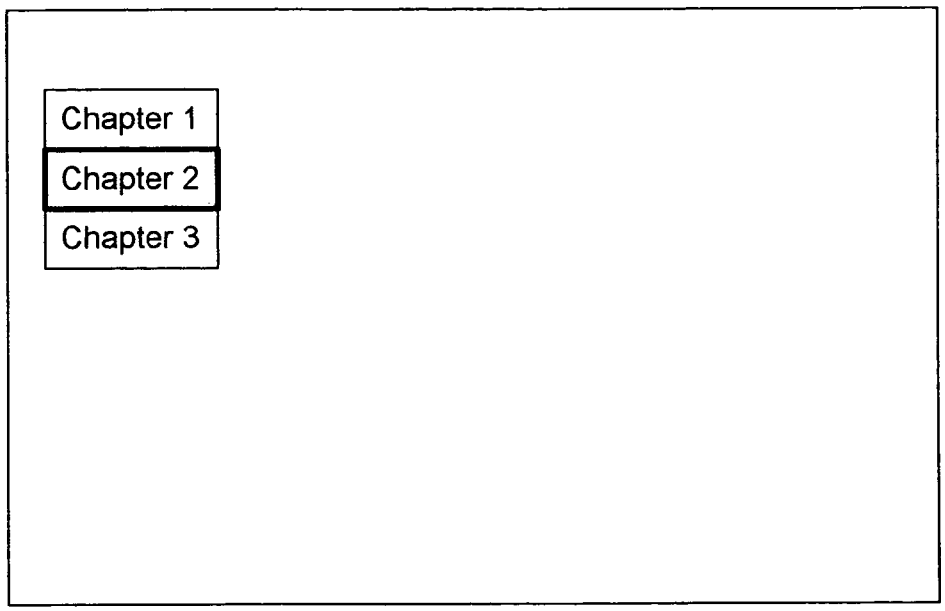
FIG. 14 is a view showing an example of a selection screen (OSD screen) for part-of-title (PTT) in the information reproducing apparatus shown in FIG. 3.

FIG. 14 shows an example of a selection screen (OSD screen) for part-of-title (PTT) in the information reproducing apparatus of this embodiment. This PTT selection screen displays information on three PTTs, and a user can select a desired PTT by, for example, operating the external operation device 24. The OSD display processing part 12C creates, through the screen creating part 23, such a PTT selection screen by using, for example, the PTT_Ns 102 of the VMGI.

The following description will be on a method of setting the order of precedence between the restriction on operation by a user's operation (UOP) and the reproduction of various kinds of menus such as the sub-picture menu (SPM), the audio menu (AM), the angle menu (AGLM), and the part-of-title menu (PTTM).

Figure 15:
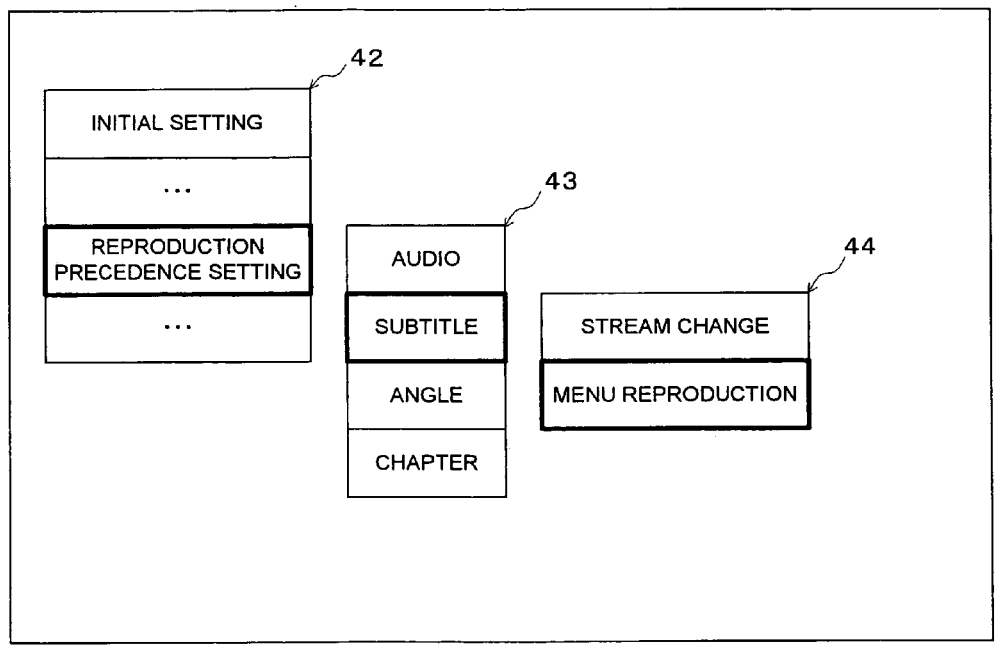
FIG. 15 is a view showing an example of a screen for setting the order of precedence.

FIG. 15 is a view showing an example of a screen for setting the order of precedence.

A menu 42 for initial setting of various functions of the information reproducing apparatus contains an item of "reproduction precedence setting". Upon user's selection of the "reproduction precedence setting" from the menu 42, a second hierarchy menu 43 composed of items as targets of the precedence setting (sub-picture (subtitle in FIG. 15), audio, angle, chapter) is displayed. When the user further selects any target from the second hierarchy menu 43, a third hierarchy menu 44 for selection of menu reproduction precedence or selection screen display precedence is displayed, and the user selects from the third hierarchy menu 44 an item that the user wants to give precedence to. The selection of the menu reproduction precedence at this time means the setting that the menu reproduction has precedence over the restriction on the operation by user operation (UOP). On the other hand, the selection of the selection screen display precedence means the setting that the restriction on the operation by user's operation (UOP) has precedence over the menu reproduction.

Figure 16:
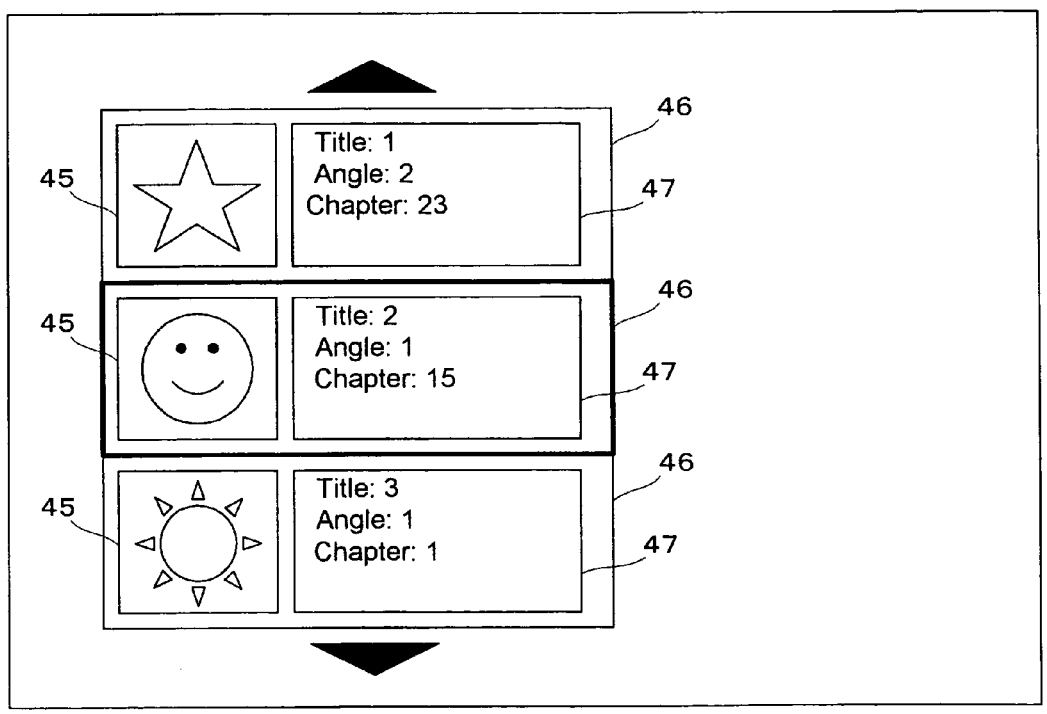

FIG. 16 shows an example of a menu selection screen on which desired title information can be searched for.

Figure 17:
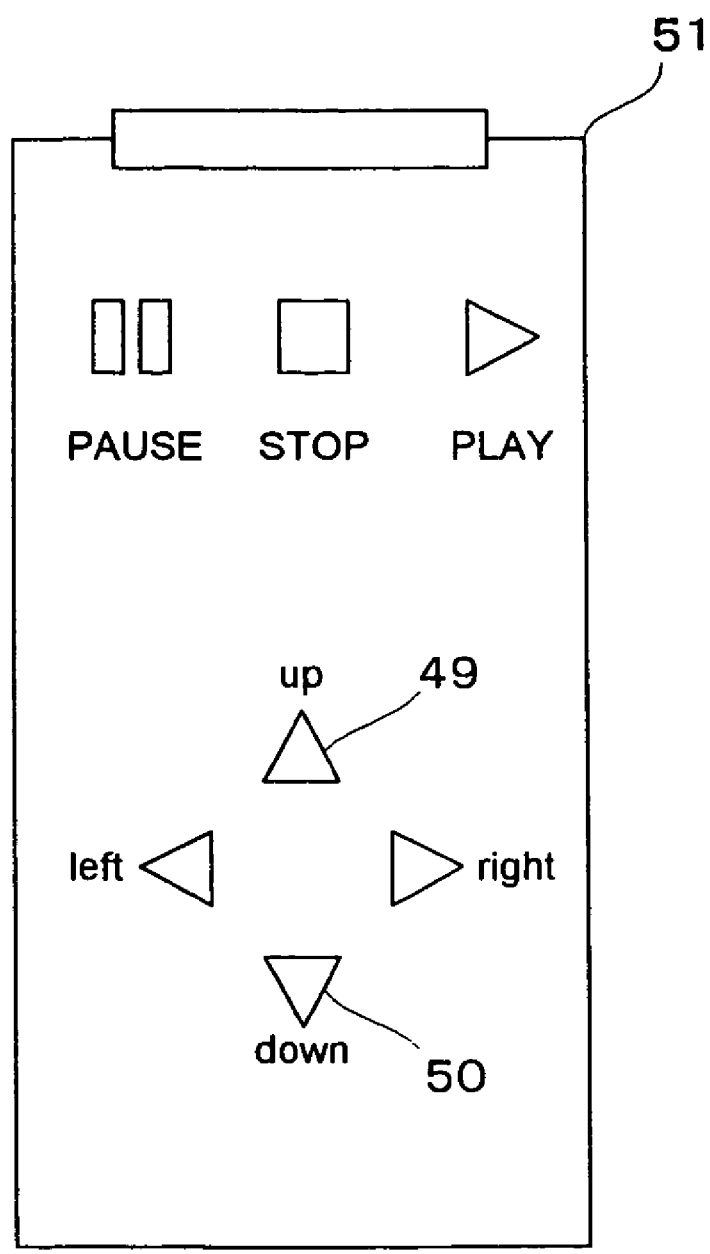
FIG. 17 is a view showing an external operation device with which the menu selection screen shown in FIG. 16 is operated.

This menu selection screen displays information on the contents of all the titles recorded in the information recording medium. Information on the contents of the individual title is composed of image information 45 and character information 47 arranged in a rectangular area 46. When the rectangular areas 46 corresponding to the respective titles are displayed, they are arranged vertically. For selecting a desired title on this menu selection screen, an external operation device 51, for example, as shown in FIG. 17 is used. Specifically, the selection can be made in such a manner that an up key 49 and a down key 50 of this external operation device 51 are operated to shift a focus 48 to the rectangular area 46 of a desired title and a selection key is pressed.

Figure 18:
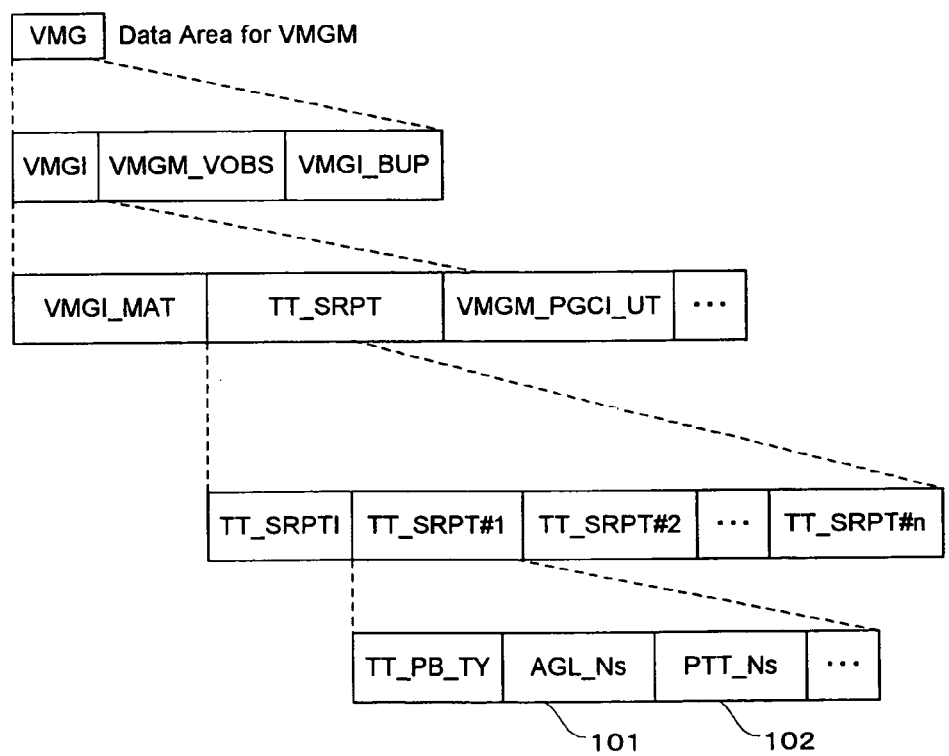
FIG. 18 is a view showing a structure of a VMG (video manager) area.

As the image information 45 displayed in the rectangular area 46, a frame at an instant a predetermined time after a head of video data as a target of actual reproduction is adopted to be displayed as a still image on the menu selection screen. Alternatively, it may be actually reproduced as a video image. As the character information 47, the contents of attribute information of each title are displayed. Information on the number of angles and information on the number of chapters which are displayed here are recorded in the AGL_Ns 101 indicating the number of angles and the PTT_Ns 102 indicating the number of chapters, the AGL_Ns 101 and the PTT_Ns 102 being included in the TT_SRP (title search pointer) for each title in the TT_SRPT (title search pointer information) of the VMGI (video manager information) shown in FIG. 18 (or see FIG. 2).

It should be noted that the present invention is not limited to the examples illustrated above, and various changes can of course be made within a range not departing from the spirit of the present invention.

In the above-described embodiment, the information reproducing apparatus was described, but the present invention is applicable also to an information recording/reproducing apparatus.

It should be understood that the present invention is not limited to specific forms described with illustration here, but all changes which come within the range of the following claims are intended to be embraced therein.

What is claimed is:

1. An information reproducing apparatus that reproduces recorded information from an information recording medium in which existence information of a sub-picture menu and information of user's operation restriction are recorded, the information reproducing apparatus comprising:
    a command input part inputting a common command for reproducing the sub-picture menu and for calling a selection screen for sub-picture change;
    a detecting part detecting the existence information of the sub-picture menu and the information of the user's operation restriction;
    a setting part setting a precedence relation between reproduction of the sub-picture menu and activation of a sub-picture reproduction selecting function for calling the selection screen for sub-picture change; and
    a processing selection part which selects processing that is to be executed in precedence over the other out of processing for the reproduction of the sub-picture menu and processing for display of the selection screen for sub-picture change, based on the precedence relation set by the setting part and a result of the detection by the detecting part, when the common command is inputted from the command input part.

2. An information reproducing apparatus as set forth in claim 1, further comprising an operation state detecting part detecting whether or not a current state is a stop state,
    wherein the processing selection part gives precedence to the reproduction of the sub-picture menu when the operation state detecting part detects that the current state is the stop state, while giving precedence to the display of the selection screen for sub-picture change when the operation state detecting part detects that the current state is a state other than the stop state.

3. An information reproducing apparatus as set forth in claim 1, wherein the sub-picture reproduction selecting function is a function of creating the selection screen for sub-picture change to display the selection screen on a reproduction screen.

4. An information reproducing apparatus that reproduces recorded information from an information recording medium in which existence information of an audio menu and information of user's operation restriction are recorded, the information reproducing apparatus comprising:
    a command input part inputting a common command for reproducing the audio menu and for calling a selection screen for audio change;
    a detecting part detecting the existence information of the audio menu and the information of the user's operation restriction;
    a setting part setting a precedence relation between reproduction of the audio menu and activation of an audio reproduction selecting function for calling the selection screen for audio change; and
    a processing selection part which selects processing that is to be executed in precedence over the other out of processing for the reproduction of the audio menu and processing for display of the selection screen for audio change, based on the precedence relation set by the setting part and a result of the detection by the detecting part, when the common command is inputted from the command input part.

5. An information reproducing apparatus as set forth in claim 4, further comprising an operation state detecting part detecting whether or not a current state is a stop state,
    wherein the processing selection part gives precedence to the reproduction of the audio menu when the operation state detecting part detects that the current state is the stop state, while giving precedence to the display of the selection screen for audio change when the operation state detecting part detects that the current state is a state other than the stop state.

6. An information reproducing apparatus as set forth in claim 4, wherein the audio reproduction selecting function is a function of creating the selection screen for audio change to display the selection screen on a reproduction screen.

7. An information reproducing apparatus that reproduces recorded information from an information recording medium in which existence information of an angle menu and information of user's operation restriction are recorded, the information reproducing apparatus comprising:
    a command input part inputting a common command for reproducing the angle menu and for calling a selection screen for angle change;
    a detecting part detecting the existence information of the angle menu and the information of the user's operation restriction;
    a setting part setting a precedence relation between reproduction of the angle menu and activation of an angle reproduction selecting function for calling the selection screen for angle change; and
    a processing selection part which selects processing that is to be executed in precedence over the other out of processing for the reproduction of the angle menu and processing for display of the selection screen for angle change, based on the precedence relation set by the setting part and a result of the detection by the detecting part, when the common command is inputted from the command input part.

8. An information reproducing apparatus as set forth in claim 7, further comprising an operation state detecting part detecting whether or not a current state is a stop state, wherein the processing selection part gives precedence to the reproduction of the angle menu when the operation state detecting part detects that the current state is the stop state, while giving precedence to the display of the selection screen for angle change when the operation state detecting part detects that the current state is a state other than the stop state.

9. An information reproducing apparatus as set forth in claim 7, wherein the angle reproduction selecting function is a function of creating the selection screen for angle change to display the selection screen on a reproduction screen.

* * * * *